United States Patent
Dudgeon et al.

(10) Patent No.: US 9,086,811 B2
(45) Date of Patent: Jul. 21, 2015

(54) MANAGING DATA SETS OF A STORAGE SYSTEM

(71) Applicant: International Business Machines Corporation, Armonk, NY (US)

(72) Inventors: Kyle B. Dudgeon, Vail, AZ (US); David C. Reed, Tucson, AZ (US); Esteban Rios, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 13/943,875

(22) Filed: Jul. 17, 2013

(65) Prior Publication Data

US 2015/0026422 A1    Jan. 22, 2015

(51) Int. Cl.
  *G06F 12/00* (2006.01)
  *G06F 3/06* (2006.01)
  *G06F 11/20* (2006.01)
  *G06F 12/02* (2006.01)

(52) U.S. Cl.
  CPC .............. *G06F 3/0619* (2013.01); *G06F 3/065* (2013.01); *G06F 3/067* (2013.01); *G06F 3/0646* (2013.01); *G06F 3/0647* (2013.01); *G06F 11/203* (2013.01); *G06F 11/2056* (2013.01); *G06F 11/2058* (2013.01); *G06F 12/02* (2013.01)

(58) Field of Classification Search
  CPC ..... G06F 12/02; G06F 3/0646; G06F 3/0647; G06F 3/067; G06F 11/203; G06F 11/2056; G06F 11/2058
  See application file for complete search history.

(56) References Cited

U.S. PATENT DOCUMENTS

| | | |
|---|---|---|
| 2006/0174080 A1 | 8/2006 | Kern |
| 2009/0043968 A1 | 2/2009 | Vanamamalai et al. |
| 2009/0150462 A1* | 6/2009 | McClanahan et al. ........ 707/204 |
| 2010/0274763 A1 | 10/2010 | Ingen et al. |
| 2012/0216000 A1 | 8/2012 | Thompson et al. |

OTHER PUBLICATIONS

Burger, C., et al., "IBM System Storage D58000 Series: IBM FlashCopy SE," IBM Redpaper, Feb. 2008. pp. 1-80. www.ibm.com/redbooks © Copyright International Business Machines Corporation 2008.

Lovelace, M., et al., "DFSMShsm Fast Replication Technical Guide," IBM Redbooks, Oct. 2011, Second Edition. pp. 1-284. www.ibm.com/redbooks © Copyright International Business Machines Corporation 2004, 2011.

* cited by examiner

*Primary Examiner* — Shawn X Gu
(74) *Attorney, Agent, or Firm* — Peder M. Jacobson; Robert Sullivan

(57) ABSTRACT

A method of and system for managing data sets of a storage facility is disclosed. The method and system may include copying a first data set of a first unit of storage space. A second data set in a second unit of storage space may be created from copying the first data set. The method and system may include copying the second data set of the second unit of storage space. A third data set in a third unit of storage space may be created from copying the second data set. The second data set may be verified. Verification may be performed by comparing the third data set with the first data set. It may be determined whether the third data set matches the first data set. The first and third data sets may be deleted in response to the third data set matching the first data set.

20 Claims, 4 Drawing Sheets

MANAGING DATA SETS OF A STORAGE SYSTEM

TECHNICAL FIELD

This disclosure relates generally to computer systems and, more particularly, relates to managing data sets of a storage system.

BACKGROUND

The amount of data that needs to be managed by enterprises is growing at an extremely high rate. Management of storage environments may need to be performed with as few errors as possible. As data needing to be managed increases, the need for management efficiency may increase.

SUMMARY

Aspects of the disclosure provide a methodology for moving a large number of data sets in a storage system. The methodology may preserve source data sets for a period of time. The methodology may allow for data integrity of target data sets to be verified after moving the data sets. The methodology may allow for recovery from and diagnosis of data corruption. Management efficiency when moving a large number of data sets in a storage system may be improved.

Aspects of the disclosure may include a method of and system for managing data sets of a storage facility. The method and system may include copying a first data set of a first unit of storage space. A second data set in a second unit of storage space may be created from copying the first data set. The method and system may include copying the second data set of the second unit of storage space. A third data set in a third unit of storage space may be created from copying the second data set. The second data set may be verified. Verification may be performed by comparing the third data set with the first data set. It may be determined whether the third data set matches the first data set. The first and third data sets may be deleted in response to the third data set matching the first data set.

Aspects of the disclosure, in embodiments, may include operating on the data sets. Operating on the data sets may include locking, unlocking, naming, and renaming the data sets. A particular data set may be operated on in response to the particular data set or another data set being operated on. For example, at least the second data set may be operated on in response to the third data set not matching the first data set. In embodiments, the second data set may be locked in response to the first data set being locked. In embodiments, each of the first, second, and third data sets may be either named or renamed at least once. Aspects of the disclosure provide a methodology for moving a large number of data sets in a storage system that may provide benefits associated with increased efficiency.

DETAILED DESCRIPTION

Figure 1:
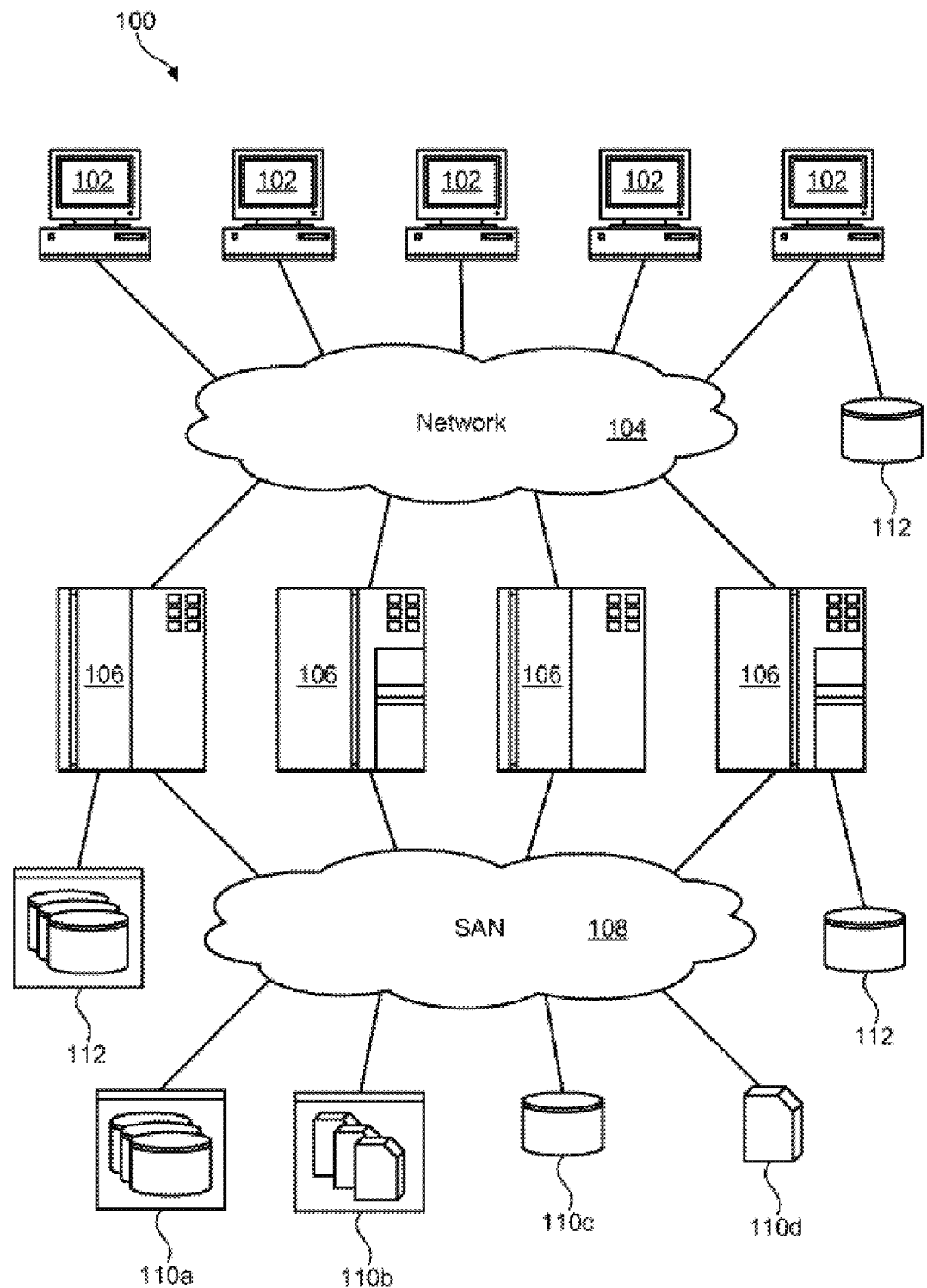
FIG. 1 illustrates an example network architecture according to embodiments.

Aspects of the disclosure provide a methodology for moving a large number of data sets in a storage system. The methodology preserves source data sets for a period of time. The methodology allows for data integrity of target data sets to be verified after moving the data sets. The methodology allows for recovery from and diagnosis of data corruption. Management efficiency when moving a large number of data sets in a storage system may be improved.

When a large number of data sets need to be moved, customer may implement a copy with delete methodology. The method copies the data set to a new set of storage units (e.g., volumes) and then deletes the original source data sets while preserving the original name. A data set can later be found to be corrupted during these mass data set movements. Corruption may occur when the data movement is done without fast replication techniques.

Fast replication is a function that uses volume-level fast replication to create backup versions for sets of storage groups. One reason that may inhibit a data set from being copied with fast replication techniques is a device not being capable of fast replication. Another reason includes control area size, block size, or blocks/track mismatch between source and target data set allocations. An additional reason could include a source data set being full while the target data set is allocated larger than the source data set.

When data is moved without fast replication, a data mover or utility is invoked which reads and writes the individual records of the data set. This process increases the probability that a record will not be copied over properly, ultimately leading to data corruption. Unfortunately, due to the deletion of the source data set during that process, it is nearly impossible to recover the data, much less determine what caused the corruption. Aspects of the disclosure may provide a methodology allowing for recovery from and diagnosis of data corruption.

Aspects of the disclosure include a method and system for managing data sets of a storage facility (i.e., storage system). The method and system may work on a number of operating systems. The method and system may include copying a first data set of a first unit of storage space. A second data set in a second unit of storage space may be created from copying the first data set. The method and system may include copying the second data set of the second unit of storage space. A third data set in a third unit of storage space may be created from copying the second data set. The second data set may be verified. Verification may be performed by comparing the third data set with the first data set. It may be determined whether the third data set matches the first data set. The first and third data sets may be deleted in response to the third data set matching the first data set. In embodiments, deleting the first and third data sets may include removing catalog associations of the first and third data sets. The method and system may include detecting an error event in response to the third data set not matching the first data set.

Aspects of the disclosure may include operating on the data sets. Operating on the data sets may include locking (e.g., disallowing changes to), unlocking (e.g., allowing changes to), naming, and renaming the data sets. A particular data set may be operated on in response to the particular data set or another data set being operated on. For example, at least the second data set may be operated on in response to the third data set not matching the first data set. Operating on at least the second data set may include locking at least the second data set. In embodiments, the second data set may be locked in response to the first data set being locked. In embodiments, each of the first, second, and third data sets may be either named or renamed at least once. Aspects of the disclosure provide a methodology for moving a large number of data sets in a storage system that may provide benefits associated with increased efficiency.

FIG. 1 illustrates an example network architecture 100 according to embodiments. The network architecture 100 is presented to show one example of an environment where a system and method in accordance with the disclosure may be implemented. The network architecture 100 is presented only by way of example and is not intended to be limiting. The system and methods disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN), a wide-area-network (WAN), the Internet, an intranet, or the like. In certain embodiments, the computers 102, 106 may include both client computers 102 and server computers 106 (also referred to herein as "host systems" 106 or alternatively as "host devices"). In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may contain storage pools that may benefit from techniques of the disclosure.

The network architecture 100 may, in certain embodiments, include a storage network 108 behind the servers 106, such as a storage-area-network (SAN) or a LAN (e.g., when using network-attached storage). This network 108 may connect the servers 106 to one or more storage systems 110 (alternatively, remote systems or remote devices), such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may contain storage pools that may benefit from techniques according to the disclosure.

In embodiments, techniques of the disclosure may permit the storage pools of storage systems 110, 112 to recover from data found to be corrupt. Moreover, aspects of the disclosure may at least assist in determining what caused the corruption. Therefore, the methodology provided may allow for recovery from and diagnosis of data corruption in relation to the example network architecture 100 illustrated by FIG. 1.

Figure 2:
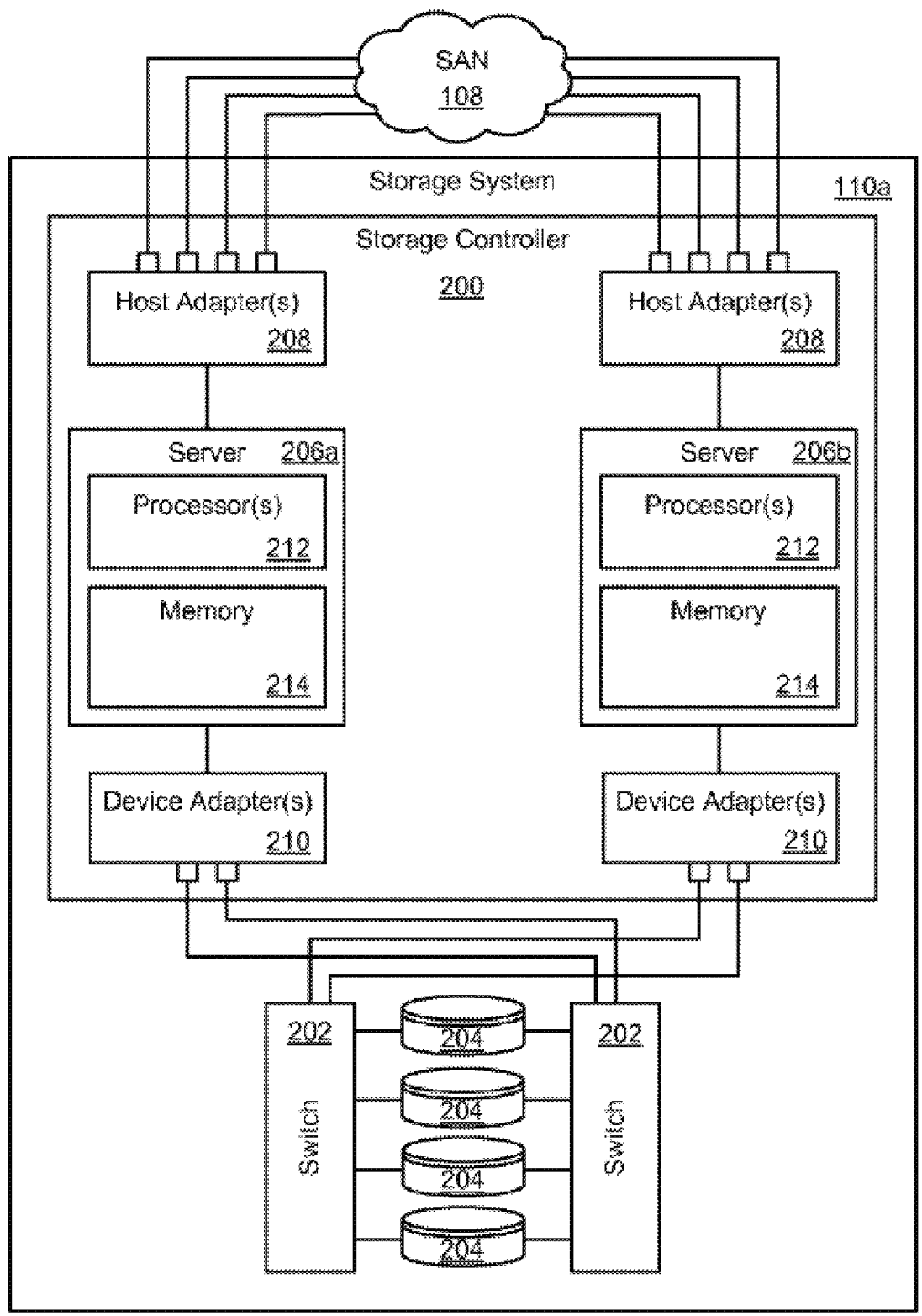
FIG. 2 illustrates an example storage system containing an array of storage devices according to embodiments.

FIG. 2 illustrates an example storage system 110a containing an array of storage devices 204 (e.g., hard-disk drives and/or solid-state drives) according to embodiments. The internal components of the storage system 110a are shown in accordance with the disclosure and may be used to manage such a storage system 110a. Nevertheless, techniques according to the disclosure may also be implemented within other storage systems 110, 112. As shown, the storage system 110a includes a storage controller 200, one or more switches 202, and one or more storage devices 204, such as hard-disk drives or solid-state drives (e.g., flash-memory-based drives). The storage controller 200 may enable one or more hosts 106 (e.g., open system and/or mainframe servers 106) to access data stored in the one or more storage devices 204.

As shown in FIG. 2, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 204. This process may be referred to as a "failover."

Particular enterprise storage systems may have a storage system 110a having an architecture similar to that illustrated in FIG. 2. Particular enterprise storage systems may include a high-performance, high-capacity storage controller providing disk storage that is designed to support continuous operations. Particular enterprise storage systems may use servers 206a, 206b, which may be integrated with a virtualization engine technology. Nevertheless, techniques according to the disclosure are not limited to any specific enterprise storage system 110a, but may be implemented in any comparable or analogous storage system 110 regardless of the manufacturer, product name, or components or component names associated with the storage system 110. Any storage system 110 that could benefit from techniques according to the disclosure is deemed to fall within the scope of the disclosure. Thus, the enterprise storage system shown is presented only by way of example and is not intended to be limiting.

In selected embodiments, each server 206 includes one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204.

In embodiments, techniques of the disclosure may permit the storage devices 204 to recover from data found to be corrupt. Moreover, aspects of the disclosure may at least assist in determining what caused the corruption. Therefore, the methodology provided may allow for recovery from and diagnosis of data corruption in relation to the example storage system 110a containing an array of storage devices 204 illustrated by FIG. 2.

Figure 3:
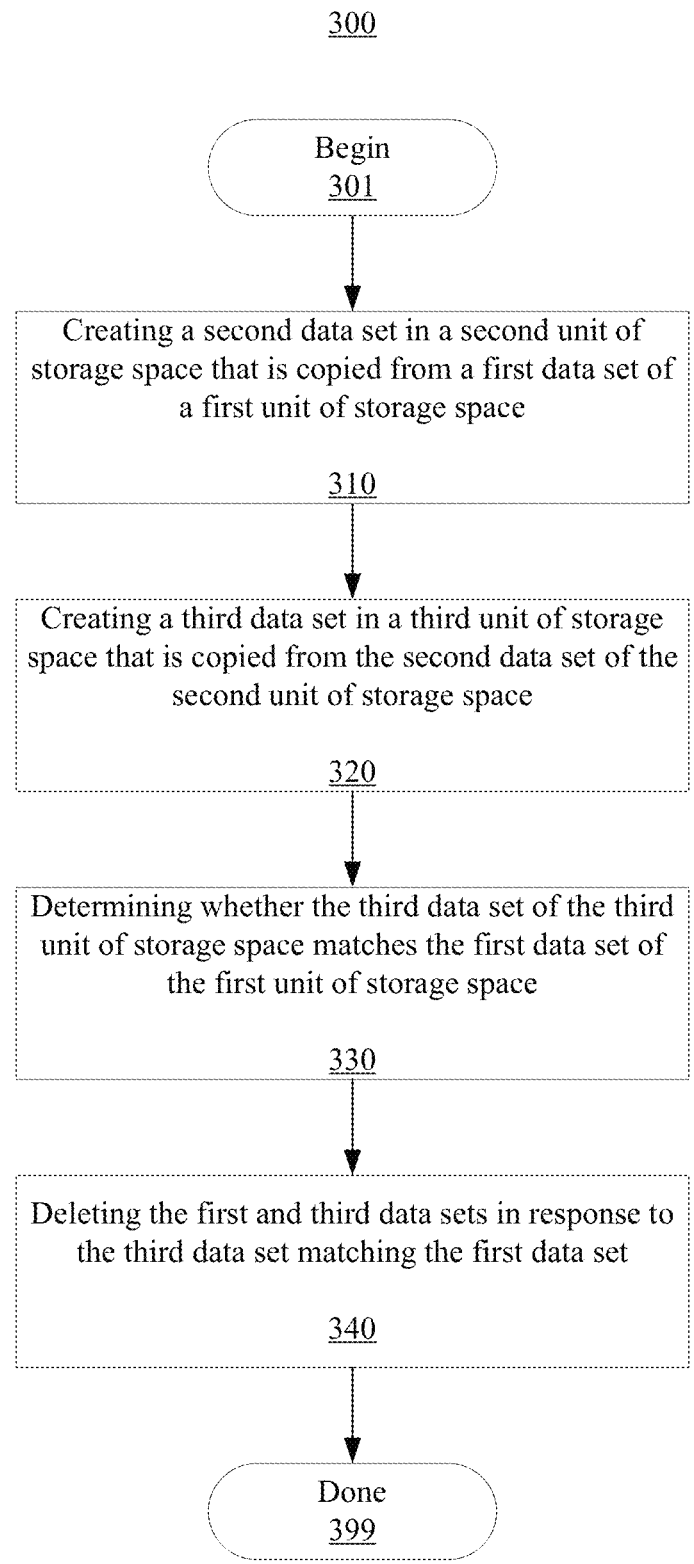
FIG. 3 is a flowchart illustrating a method for managing data sets of a storage system according to embodiments.

FIG. 3 is a flowchart illustrating a method 300 for managing data sets of a storage system according to embodiments. Method 300 may begin at block 301. The method 300 may be established by adding a new keyword. The new keyword may be added to an existing keyword such as "COPY." In embodiments, the method 300 may include operating on the data sets. Operating on the data sets may include locking (e.g., disallowing changes to), unlocking (e.g., allowing changes to), naming, and renaming the data sets. A particular data set may be operated on in response to the particular data set or another data set being operated on. In embodiments, each of the first, second, and third data sets may be either named or renamed at least once. In embodiments, a first data set of a first unit of storage space may be locked. In embodiments, locking the first data set (which may include at least ensuring that the first data set is locked) may be a phase of method 300 (e.g., the first phase, the second phase).

The method 300 may provide a methodology for moving a large number of data sets in a storage system. The method may preserve source data sets for a period of time. The method may account for updating to the data sets. The method may allow for data integrity of target data sets to be verified after moving the data sets. The method may allow for recovery from and diagnosis of data corruption.

At block 310, the method 300 may include copying the first data set of the first unit of storage space. A second data set in a second unit of storage space may be created from copying the first data set. In embodiments, the second data set may be locked in response to the first data set being locked. Thus, a locked first data set may be copied and create a locked second data set. In embodiments, creating a nearly instantaneous, point-in-time copy of the first data set that is immediately available for both read and write access may or may not be possible (in conjunction with block 310) (e.g., using Flash-Copy may not be possible). At block 320, the method 300 may include copying the second data set of the second unit of storage space. A third data set in a third unit of storage space may be created from copying the second data set. In embodiments, creating a nearly instantaneous, point-in-time copy of the second data set that is immediately available for both read and write access may be possible (in conjunction with block 320) (e.g., using FlashCopy may be possible). In embodiments, a phase (e.g., the first phase, the second phase) of method 300 may include determining whether a fast replication technique (e.g., FlashCopy) may be used. Such phase may include a determination for each of one or more data sets. In embodiments, host input-output (I/O) techniques such as using an access method utility or data mover I/O may move information.

Accesses to the data sets (e.g., copying operations, changing operations) may be made based upon names of the data sets. In embodiments, for example, the first data set of the first unit of storage may have a first name. At least the first data set of the first unit of storage space may be locked in response to a request to create the second data set in the second unit of storage space. Copying may commence. The second data set of the second unit of storage space may be named a second name in response to creating the second data set in the second unit of storage space. The second data set may be locked because the first data set is locked. The third data set of the third unit of storage space may be named a third name in response to creating the third data set in the third unit of storage space. (Thus, the second and third data sets may be 'effective copies' or 'shadow data sets' of the first data set). The first data set of the first unit of storage space may be renamed to a fourth name. The second data set of the second unit of storage space may be renamed to the first name in response to renaming the first data set of the first unit of storage space the fourth name. At least the second data set of the second unit of storage space may be unlocked in response to renaming the second data set of the second unit of storage space the first name. At such point, the second data set may be able to be updated. The first and third data sets may be cataloged (including indexed). The first and third data sets may be shadow data sets of the second data set and may be indicated as such. The names may be considered temporary names. Naming and renaming include other similar logic operations (e.g., distinguishing characteristics).

The second data set may be verified. Verification may be performed by comparing the third data set with the first data set. It may be determined whether the third data set matches the first data set at block 330. For example, the information in the third data set may be compared against the information in the first data set. The information in the second data set may be unlocked. Thus, the second data set may be able to be updated and may no longer match the information in the first data set. In order to compare the information, different techniques may be used depending on the type of information contained. For instance, if the data sets are not virtual storage access method (VSAM) data sets, a utility which compares data sets such as IEBCOMPR (an example mainframe utility program) may be used to compare the third data set with the first data set. On the other hand, if the data sets are VSAM data sets with records, then the information may be sequentially read and the record count of the third data set and first data set may be compared.

The first and third data sets may be deleted in response to the third data set matching the first data set at block 340. In embodiments, deleting the first and third data sets may include removing catalog associations (including indexing associations) of the first and third data sets. The method and system may include detecting an error event in response to the third data set not matching the first data set. In embodiments, at least the second data set may be operated on in response to the third data set not matching the first data set (or the error event). Operating on at least the second data set may include locking at least the second data set. Locking the second data set may occur through use of an immediate exclusive enqueue (ENQ) or similar command.

For example, if the second data set and the third data set were copied/created by copying track images, then the information in both the second data set and the third data set were identical at the time of the COPY. The second and third data sets not matching indicates that an error occurred during the host I/O COPY from the first data set to the second data set. An error message may then issued to the customer/client indicating that the information in the second data set does not match the information from the first data set. A timestamp of when the COPY was made may be reported to the customer/client along with data regarding the nature of the mismatch (perhaps the exact nature of the mismatch). The customer/client can then decide if they want to return (e.g., fall back) to the first data set and perform forward recovery from the time of the COPY through the time of the locked second data set, or if the customer/client wants to allow updates to continue to the second data set and use some other mechanism to resolve inconsistencies between information of the first data set and information of the third data set.

Method 300 may conclude at block 399. Aspects of method 300 may provide benefits associated with increased efficiency when moving a large number of data sets in a storage system. Altogether, a storage system may be managed more efficiently.

Figure 4:
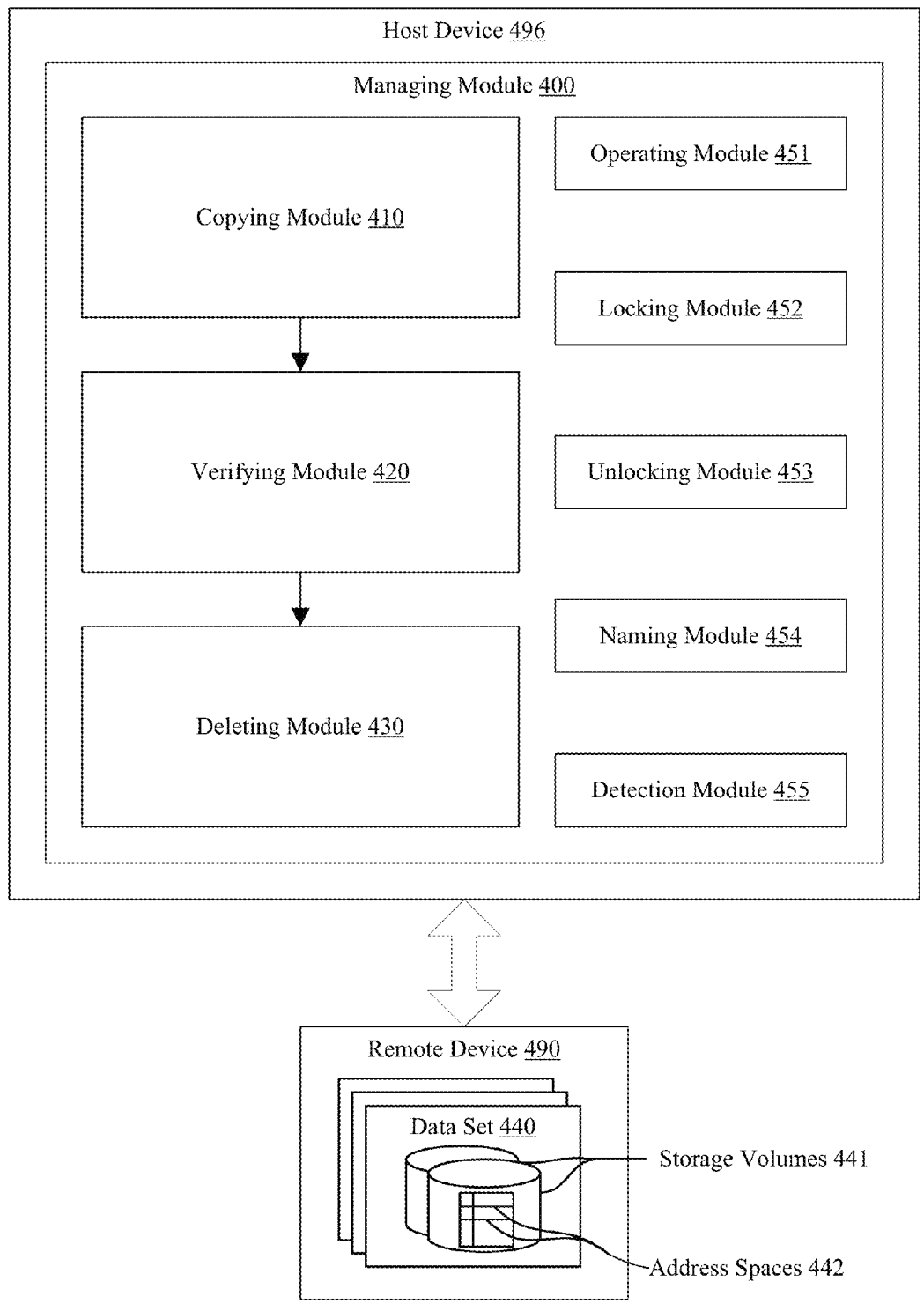
FIG. 4 shows modules of a system performing a copy and verification of data sets according to embodiments.

FIG. 4 shows modules of a system for performing a copy and verification of data sets according to embodiments. In embodiments, method 300 may be implemented using one or more modules of FIG. 4. These modules may be implemented in hardware, software or firmware executable on hardware, or a combination thereof. For example, module functionality that may occur in a host device 496 may actually be implemented in a remote device 490 and vice versa. Other functionality may be distributed across the host device 496 and the remote device 490.

The host device 496 may include a managing module 400. The managing module 400 may be configured and arranged to manage a storage facility. The managing module 400 may include a copying module 410, a verifying module 420, a deleting module 430, an operating module 451, a locking module 452, an unlocking module 453, a naming module 454, and a detection module 455. The remote device 490 may have a data set 440 comprising storage volumes 441 having address spaces 442.

The copying module 410 may copy the first data set of the first unit of storage space. A second data set in a second unit of storage space may be created from copying the first data set. In embodiments, the second data set may be locked in response to the first data set being locked. Thus, a locked first data set may be copied and create a locked second data set. The copying module 410 may copy the second data set of the second unit of storage space. A third data set in a third unit of storage space may be created from copying the second data set.

The verifying module 420 may verify information of the second data set. Verification may be performed by comparing the third data set with the first data set. The verifying module may determine whether the third data set matches the first data set. For example, the information in the third data set may be compared against the information in the first data set by the verifying module 420. The deleting module 430 may delete the first and third data sets in response to the third data set matching the first data set. In embodiments, deleting the first and third data sets may include removing catalog associations (including indexing associations) of the first and third data sets.

The detection module 455 may detect an error event in response to the third data set not matching the first data set. The operating module 451 may operate on at least the second data set in response to the third data set not matching the first data set (or the error event). Operating on at least the second data set may include locking at least the second data set. Locking the second data set may occur through use of an immediate exclusive enqueue (ENQ) or similar command. In embodiments, operating on may include locking, unlocking, naming, renaming, cataloging, etc.

The locking module 452 may lock at least one data set. The unlocking module 453 may unlock at least one data set. The naming module 454 may name (or rename) at least one data set. In embodiments, a renaming module may exist. In embodiments, the operating module 451 may include the locking, unlocking, naming, and renaming modules. The modules may work together and, in embodiments, concurrently.

For example, the first data set of the first unit of storage may have a first name. At least the first data set of the first unit of storage space may be locked by the locking module 452 in response to a request to create with the copying module 410 the second data set in the second unit of storage space. The second data set of the second unit of storage space may be named a second name by the naming module 454 in response to the copying module 410 creating the second data set in the second unit of storage space. The second data set may be locked upon creation by the copying module 410 because the first data set is locked. The third data set of the third unit of storage space may be named a third name by the naming module 454 in response to the copying module 410 creating the third data set in the third unit of storage space. The first data set of the first unit of storage space may be renamed to a fourth name by the naming module 454. The second data set of the second unit of storage space may be renamed to the first name by the naming module 454 in response to renaming the first data set of the first unit of storage space the fourth name. At least the second data set of the second unit of storage space may be unlocked by the unlocking module 453 in response to renaming the second data set of the second unit of storage space the first name by the naming module 454. At such point, the second data set may be able to be updated.

Aspects of managing module 400 may provide benefits associated with increased efficiency when moving a large number of data sets in a storage system. Altogether, a storage system may be managed more efficiently.

In addition to embodiments described above, other embodiments having fewer operational steps, more operational steps, or different operational steps are contemplated. Also, some embodiments may perform some or all of the above operational steps in a different order. The modules are listed illustratively according to an embodiment and are not meant to indicate necessity of a particular module or exclusivity of other potential modules.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: an object oriented programming language such as Java, Smalltalk, C++, or the like; and conventional procedural programming languages, such as the "C" programming language or similar programming languages. The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to exemplary embodiments, other and further embodiments of the disclosure may be devised without departing from the basic scope thereof, and the scope thereof is determined by the claims that follow.

What is claimed is:

1. A computer-implemented method for managing data sets of a storage system, the method comprising:
creating, in a second unit of storage space, a second data set that is copied from a first data set of a first unit of storage space;
creating, in a third unit of storage space, a third data set that is copied from the second data set of the second unit of storage space;
determining whether the third data set of the third unit of storage space matches the first data set of the first unit of storage space; and
deleting the first and third data sets in response to the third data set matching the first data set.

2. The method of claim 1, further comprising operating on at least the second data set in response to the third data set not matching the first data set.

3. The method of claim 2, wherein operating on at least the second data set includes locking at least the second data set.

4. The method of claim 1, further comprising locking at least the first data set to disallow changes when copying.

5. The method of claim 1, wherein the second data set is locked in response to the first data set being locked.

6. The method of claim 1, further comprising unlocking at least the second data set of the second unit of storage space.

7. The method of claim 1, wherein the first data set of the first unit of storage has a first name, the method further comprising:
 naming the second data set of the second unit of storage space a second name;
 naming the third data set of the third unit of storage space a third name;
 renaming the first data set of the first unit of storage space a fourth name; and
 renaming the second data set of the second unit of storage space the first name.

8. The method of claim 1, wherein deleting the first and third data sets further comprises removing catalog associations of the first and third data sets.

9. The method of claim 1, further comprising detecting an error event in response to the third data set not matching the first data set.

10. A computer-implemented method for managing data sets of a storage system, the method comprising:
 copying a first data set of a first unit of storage space to create a second data set in a second unit of storage space and copying the second data set in the second unit of storage space to create a third data set in a third unit of storage space;
 verifying the second data set by comparing the third data set with the first data set; and
 performing one of a group consisting essentially of:
  deleting the first and third data sets in response to the third data set matching the first data set; and
  operating on at least the second data set in response to the third data set not matching the first data set.

11. The method of claim 10, wherein the first data set of the first unit of storage has a first name, further comprising:
 locking at least the first data set of the first unit of storage space in response to a request to create the second data set in the second unit of storage space;
 naming the second data set of the second unit of storage space a second name in response to creating the second data set in the second unit of storage space, wherein the second data set is locked in response to the first data set being locked;
 naming the third data set of the third unit of storage space a third name in response to creating the third data set in the third unit of storage space;
 renaming the first data set of the first unit of storage space a fourth name;
 renaming the second data set of the second unit of storage space the first name in response to renaming the first data set of the first unit of storage space the fourth name; and
 unlocking at least the second data set of the second unit of storage space in response to renaming the second data set of the second unit of storage space the first name.

12. A system for managing data sets in a storage facility, comprising:
 a remote device; and
 a host device, at least one of the remote device and the host device including a managing module, the managing module comprising:
  a copying module to copy a first data set of a first unit of storage space to create a second data set in a second unit of storage space and copies the second data set in the second unit of storage space to create a third data set in a third unit of storage space;
  a verifying module to verify the second data set created by the copying module by comparing the third data set created by the copying module with the first data set; and
  a deleting module to delete the first and third data sets in response to the third data set matching the first data set.

13. The system of claim 12, further comprising an operating module to operate on at least the second data set in response to the third data set not matching the first data set.

14. The system of claim 13, wherein the operating module to operate on at least the second data set is configured to lock at least the second data set.

15. The system of claim 12, further comprising a locking module to lock at least the first data set to disallow changes when copying.

16. The system of claim 12, further comprising a locking module to lock at least the second data set in response to the first data set being locked.

17. The system of claim 12, further comprising an unlocking module to unlock at least the second data set of the second unit of storage space.

18. The system of claim 12, wherein the first data set of the first unit of storage has a first name, the system further comprising a naming module that:
 names the second data set of the second unit of storage space a second name;
 names the third data set of the third unit of storage space a third name;
 renames the first data set of the first unit of storage space a fourth name; and
 renames the second data set of the second unit of storage space the first name.

19. The system of claim 12, wherein the deleting module to delete the first and third data sets further comprises a catalog removal module that removes catalog associations of the first and third data sets.

20. The system of claim 12, further comprising a detection module to detect an error event in response to the third data set not matching the first data set.

* * * * *